United States Patent
Ruckauer et al.

(10) Patent No.: US 11,853,875 B2
(45) Date of Patent: Dec. 26, 2023

(54) NEURAL NETWORK APPARATUS AND METHOD

(71) Applicants: SAMSUNG ELECTRONICS CO., LTD., Suwon-si (KR); UNIVERSITAET ZUERICH, Zurich (CH)

(72) Inventors: Bodo Ruckauer, Zurich (CH); Shih-Chii Liu, Zurich (CH)

(73) Assignees: Samsung Electronics Co., Ltd., Suwon-si (KR); UNIVERSITAET ZUERICH, Zurich (CH)

(*) Notice: Subject to any disclaimer, the term of this patent is extended or adjusted under 35 U.S.C. 154(b) by 1105 days.

(21) Appl. No.: 16/168,024

(22) Filed: Oct. 23, 2018

(65) Prior Publication Data

US 2019/0122110 A1    Apr. 25, 2019

Related U.S. Application Data

(60) Provisional application No. 62/575,635, filed on Oct. 23, 2017.

(30) Foreign Application Priority Data

Jul. 27, 2018    (KR) .................. 10-2018-0087650

(51) Int. Cl.
*G06N 3/08*    (2023.01)
*G06N 3/04*    (2023.01)

(52) U.S. Cl.
CPC ............ *G06N 3/08* (2013.01); *G06N 3/04* (2013.01)

(58) Field of Classification Search
CPC ................. G06N 3/08; G06N 3/04
See application file for complete search history.

(56) References Cited

U.S. PATENT DOCUMENTS

| | | | |
|---|---|---|---|
| 9,412,051 B1* | 8/2016 | Chelian | G06N 3/0445 |
| 2013/0151449 A1* | 6/2013 | Ponulak | G06N 3/049 706/25 |
| 2016/0328642 A1* | 11/2016 | Himebaugh | G06N 3/0635 |
| 2017/0024661 A1* | 1/2017 | Hunsberger | G06N 20/00 |

OTHER PUBLICATIONS

Zambrano, D., Nusselder, R., Scholte, H. S., & Bohté, S. (2017). Efficient computation in adaptive artificial spiking neural networks. arXiv preprint arXiv:1710.04838. (Year: 2017).*

Ly, C. (2015). Firing rate dynamics in recurrent spiking neural networks with intrinsic and network heterogeneity. Journal of computational neuroscience, 39(3), 311-327. (Year: 2015).*

(Continued)

*Primary Examiner* — Ying Yu Chen
*Assistant Examiner* — Lokesha G Patel
(74) *Attorney, Agent, or Firm* — NSIP Law

(57) ABSTRACT

A processor-implemented neural network method includes acquiring connection weight of an analog neural network (ANN) node of a pre-trained ANN; and determining, a firing rate of a spiking neural network (SNN) node of an SNN, corresponding to the ANN node, based on an activation of the ANN node which is determined based on the connection weight. and the firing rate is also determined based on information indicating a timing at which the SNN node initially fires.

20 Claims, 6 Drawing Sheets

(56) References Cited

OTHER PUBLICATIONS

Song, T., & Pan, L. (2015). Spiking neural P systems with rules on synapses working in maximum spiking strategy. IEEE transactions on nanobioscience, 14(4), 465-477. (Year: 2015).*

Iakymchuk, T., Rosado, A., Frances, J. V., & Batallre, M. (Jul. 2012). Fast spiking neural network architecture for low-cost FPGA devices. In 7th International Workshop on Reconfigurable and Communication-Centric Systems-on-Chip (ReCoSoC) (pp. 1-6). IEEE. (Year: 2012).*

Caron, L. C., D'Haene, M., Mailhot, F., Schrauwen, B., & Rouat, J. (2013). Event management for large scale event-driven digital hardware spiking neural networks. Neural networks, 45, 83-93. (Year: 2013).*

Zambrano, D., Nusselder, R., Scholte, H. S., & Bohté, S. (2017). Efficient computation in adaptive artificial spiking neural networks. arXiv preprint arXiv:1710.04838. (Year: 2017) (Year: 2017).*

Ly, C. (2015). Firing rate dynamics in recurrent spiking neural networks with intrinsic and network heterogeneity. Journal of computational neuroscience, 39(3), 311-327. (Year: 2015) (Year: 2015).*

Iakymchuk, T., Rosado, A., Frances, J. V., & Batallre, M. (Jul. 2012). Fast spiking neural network architecture for low-cost FPGA devices. In 7th International Workshop on Reconfigurable and Communication-Centric Systems-on-Chip (ReCoSoC) (pp. 1-6). IEEE. (Year: 2019) (Year: 2012).*

Wu, Q. X., McGinnity, T. M., Maguire, L. P., Glackin, B., & Belatreche, A. (2006). Learning under weight constraints in networks of temporal encoding spiking neurons. Neurocomputing, 69(16-18), 1912-1922. (Year: 2006).*

Binas, J., Indiveri, G., & Pfeiffer, M. (May 2016). Spiking analog VLSI neuron assemblies as constraint satisfaction problem solvers. In 2016 IEEE International Symposium on Circuits and Systems (ISCAS) (pp. 2094-2097). IEEE. (Year: 2016).*

Vazquez, R. A. (Jun. 2011). Training spiking neural models using cuckoo search algorithm. In 2011 IEEE Congress of Evolutionary Computation (CEC) (pp. 679-686). IEEE. (Year: 2011).*

Iannella, Nicolangelo, et al. "A Spiking Neural Network Architecture for Nonlinear Function Approximation." *Neural Networks* 14.6-7 (2001): 933-939. (8 pages, in English).

* cited by examiner

NEURAL NETWORK APPARATUS AND METHOD

CROSS-REFERENCE TO RELATED APPLICATIONS

This application claims the benefit under 35 U.S.C. § 119(e) of U.S. Provisional Application No. 62/575,635 filed on Oct. 23, 2017, in the U.S. Patent and Trademark Office, and the benefit under 35 U.S.C. § 119(a) of Korean Patent Application No. 10-2018-0087650 filed on Jul. 27, 2018, in the Korean Intellectual Property Office, the entire disclosures of which are incorporated herein by reference for all purposes.

BACKGROUND

1. Field

The following description relates to a neural network apparatus and method.

2. Description of Related Art

Research has been conducted regarding the application of a recognition method to a device so that the device may solve a complex issue or an issue with an unknown solution. The research includes research on neural networks. In an example, the neural network may perform mapping between input patterns and output patterns through the learning. Also, the neural network may have a generalization capability to generate a relatively correct output in response to an input pattern that is not used in training of the neural network.

A deep neural network may be applied as a state-of-the-art technology in many machine learning application fields, for example, in object detection and classification, scene parsing, and video captioning.

SUMMARY

In one general aspect, there is provided a processor-implemented neural network method including: acquiring connection weight of an analog neural network (ANN) node of a pre-trained ANN; and determining, a firing rate of a spiking neural network (SNN) node of an SNN, corresponding to the ANN node, based on the connection weight and information indicating a timing at which the SNN node fires.

The method may further include generating the SNN based on the determined firing rate of the SNN node The information indicating the timing at which the SNN node fires may be determined based on first timing information about the timing at which the SNN node initially fires The determining of the firing rate may further include: determining the first timing information based on previous timing information indicating a timing at which another SNN node of a previous layer connected to the SNN node fires; and determining the firing rate based on the determined first timing information.

The first timing information may be determined based on a connection weight between the SNN node and the other SNN node.

The determined firing rate may be inversely proportional to the timing at which the SNN node first fires.

The SNN node may generate a maximum of one spike during an inference of one input.

A node potential threshold for firing of the SNN node may be determined based on potential information of other SNN nodes of a previous layer connected to the SNN node.

The node potential threshold may be determined based on node potential information of SNN nodes that correspond to a positive post-synaptic potential among the other SNN nodes.

Nodes including a positive post-synaptic potential among the other SNN nodes may provide signals corresponding to the potential information to the SNN node.

The method may further include: Retraining the ANN to filter activations of the ANN based on a predetermined minimum threshold, wherein the weight is acquired based on a result of the retraining.

The filtering of the activation may further include filtering out an activation of the activations that is less than or equal to the threshold.

A non-transitory computer-readable storage medium may store instructions that, when executed by one or more processors, cause the one or more processors to perform the method.

In another general aspect, there is provided a neural network apparatus including: one or more processors configured to: determine a firing rate of a spiking neural network (SNN) node of an SNN, corresponding to an analog neural network (ANN) node of an ANN, based on respective weights of a the ANN node and firing timing information of the SNN node.

The firing time information may further include first timing information about a timing at which the SNN node first fires.

The one or more processors may be configured to determine the first timing information based on previous timing information indicating a timing at which another SNN node of a previous layer connected to the SNN node fires, and based on a connection weight between the SNN node and the other node.

The one or more processors may be configured to determine a node potential threshold for firing of the SNN node, based on potential information of the other SNN node.

The one or more processors may further be configured to: retrain activations of the ANN based on a predetermined threshold wherein the activation is acquired based on a result of the filtering.

The one or more processors may be one or more neuromorphic processors.

The apparatus may further include memory storing instructions that, when executed by the one or more processors, configure the one or more processors to perform the determination.

In another general aspect, there is provided a processor-implemented neural network method including: acquiring a weight of an ANN node of a pre-trained ANN; determining, based on the weight, an initial firing timing of an SNN node corresponding to the ANN node; and generating the SNN based on the determined firing rate of the SNN node.

The determining of the initial firing time of the SNN node may further include: receiving a signal from another SNN node of a previous layer indicating a spike of the other SNN node to be subsequently generated; adjusting, based on the received signal, a node potential threshold of the SNN node; and determining, based on a result of the adjusting, the initial firing time of the SNN node.

The generating of the SNN may further include setting a node potential threshold of the SNN node based on receipt of only a single activation spike from another SNN node of a previous layer, and a firing timing of the SNN node may be based on the weight of the ANN node.

Other features and aspects will be apparent from the following detailed description, the drawings, and the claims.

Figure 1:
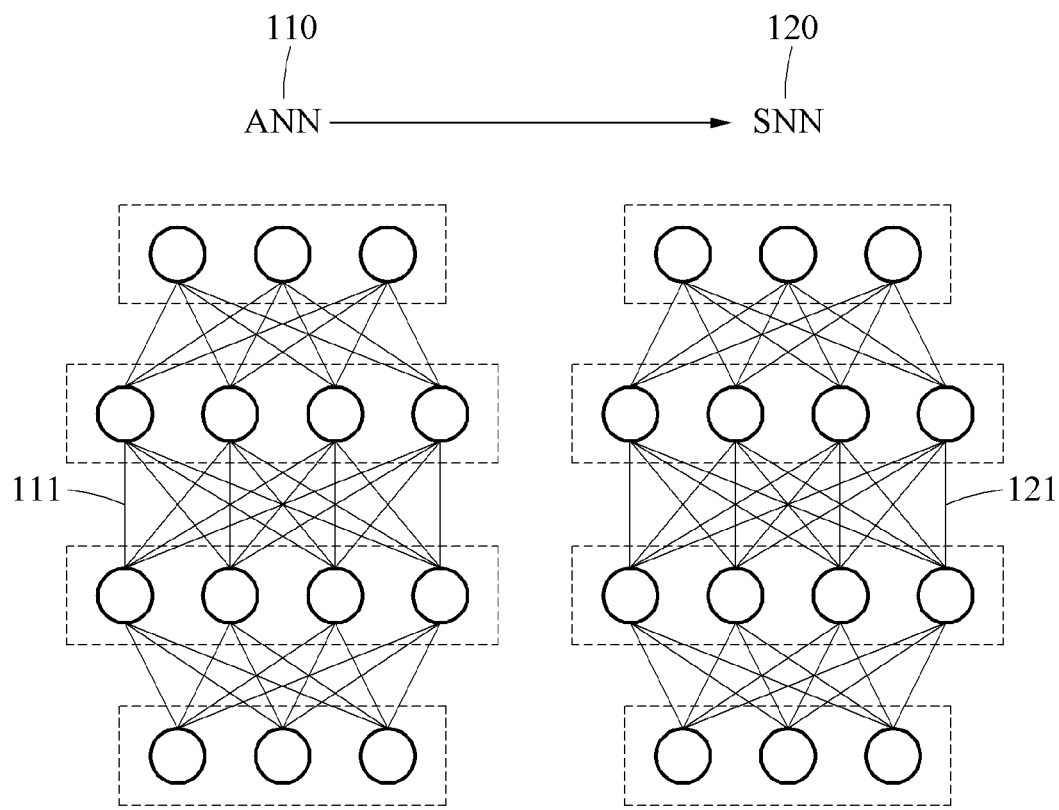
FIG. 1 illustrates an example of a process of converting an analog neural network (ANN) to a spiking neural network (SNN).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the patent application, however, should not be construed as limited to the examples set forth herein. Like reference numerals illustrated in the drawings refer to like components throughout the specification.

In the following description, various modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not intended to be limiting. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood after an understanding of the disclosure of the present application. Terms defined in dictionaries generally used should be construed to have meanings matching with contextual meanings in the related art and in view of the disclosure of the present application, and are not to be construed as an ideal or excessively formal meaning unless otherwise defined herein.

Regarding the reference numerals assigned to the elements in the drawings, it should be noted that the same elements will be designated by the same reference numerals for convenience of explanation, wherever possible, even though they are shown in different drawings and even though examples are not limited thereto. Also, in the description of examples, detailed description of example related structures or functions will be omitted when it is deemed that such description will cause ambiguous interpretation of the corresponding disclosure.

A typical analog neural network (ANN) is a deep neural network including a plurality of hidden layers, and includes, for example, a convolutional neural network (CNN).

In a process of using the typical ANN, floating-point multiply-accumulates (MACs) operations may be used to calculate respective activation values (or activations) of each of the neurons of each layer of the ANNs. The floating-point MAC operations may be performed in parallel by a Graphical Processing Units (GPUs), for example, however, a use of the GPU in an embedded application may be limited if the GPU has a high power consumption.

To address such an above-described limitation of the typical ANN, a spiking neural network (SNN) of the present disclosure employing "all-or-none pulses" to transfer information may be used, which may require less power consumption than a corresponding ANN implementation.

In an SNN of the present disclosure, when a state (for example, a neuron (or node) potential) of a neuron of the SNN reaches a predetermined threshold, the neuron fires or "spikes", and a timing for firing or spiking may affect a function of the SNN. In a non-limiting example, the firing or spiking of the neuron comprises generating one or more outputs by performing one or more operations. When the neuron fires, the neuron generates a spike (e.g., an output) that is transmitted to other neurons of the SNN, and the spike has an influence on states of the other neurons based on a time at which the spike is received (e.g., the spike may affect, or be added to, the states (or potentials) of the other neurons).

Because operations of the SNN of the present disclosure may be based on an addition operation of adding up the number of spikes, which requires less processing power than a MAC operation, one or more processors (or other specialized hardware) on which the SNN of the present disclosure may be implemented to have a higher power efficiency than apparatuses on which the typical ANN based on MACs operations may be implemented. Further, because neurons of the SNN of the present disclosure may fire or spike when the state or potential of the neuron reaches the particular predetermined threshold, as opposed to firing at a more frequent firing rate, the SNN of the present disclosure may not need to perform as many operations as the typical ANN using such MACs operations nor those of typical SNNs that fire many spikes with respect to a received activation, and thus one or more processors (or other specialized hardware) in which the SNN of the present disclosure is implemented may have a higher power efficiency than apparatuses on which the typical ANN based on MACs operations may be implemented. Also, unlike the typical ANN that updates all neurons included in the ANN at once, the SNN of the present disclosure may repeatedly and successively update an activated neuron using the addition operation. Because the addition operation used by the SNN of an example of the present disclosure requires less processing power and is therefore cheaper than MACs operations of ANNs, and because an activated neuron is updated by the SNN using the addition operation, such an SNN may be ideal for an "always-on" scenario and a low-power application. That is, in an example, because the addition operation used by such an SNN of the present disclosure requires less processing power than the MACs operation of the typical ANN, it is much cheaper and more economically practical to have the SNN of the present disclosure continually operational and available for use without need for startup, compared to the typical ANN which cannot be used in such a situation.

A neural network trained on a larger-scale data set (e.g., with more neurons, layers, and various constructions) may have improved accuracy in its output than a NN trained on a smaller-scale dataset. However, training a typical SNN with such complexity, unlike the SNN of the present disclosure, may be considerably difficult compared to training the typical ANN. That is, while there has been success in training the typical ANN based on larger-scale data sets, and while there has been some limited success in training typical SNNs based on small-scale datasets, the typical SNNs have not been successfully and efficiently trained on larger-scale datasets, as learning algorithms of the typical SNNs have been unable to successfully scale to the larger-scale datasets.

In an example implementation of an SNN of the present disclosure a pre-trained ANN may be converted to the SNN resulting in the SNN of the present disclosure which may thereby reflect a neural network having been successfully trained based on larger-scale data sets, e.g., as in the training of the ANN, and therefore the SNN of the present disclosure has improved accuracy in its results and/or outputs when compared to the typical SNNs. For example, through such conversion, the SNN may implement the trained objective of the ANN. An example of such a conversion method will be further described below with reference to FIG. 1.

In the following description, the term "node" corresponds to the above-described "neuron".

FIG. 1 illustrates an example of a process of converting an ANN to an SNN. In an example, the conversion process, the ANN, and/or the SNN may be implemented on the neural network conversion apparatus 600 of FIG. 6.

FIG. 1 illustrates an ANN 110 and an SNN 120.

The ANN 110 includes a plurality of layers, and each of the layers includes a plurality of neurons. Neurons of neighboring layers are connected via connections (or synapses). Weights are assigned to connections based on training, and first parameters 111 include the weights.

As noted, the ANN 110 includes a plurality of layers. For example, the ANN 110 includes one or more input layers, plural hidden layers and one or more output layers. Here, though the hidden layers are illustrated as two layers, this illustration is for explanatory purposes, and thus the illustrated hidden layers are intended to be also representative of one or further plural hidden layers. Similarly, the input layer and output layer are respectively representative of one or more layers. For example, there may be plural input layers that may connect to respective next hidden layers, which may ultimately connect to a single hidden layer, and there may be plural output layers that may connect to a single hidden layer or respectively to plural hidden layers. Thus, in a training example, the input layer receives an input for performing training for an inference objective, and transfers the input to the example first hidden layer, then each of the hidden layers may be configured for different layer objectives (or difference collective objectives among different sets of hidden layers) or the number of hidden layers may be selected after varied architectures and desired efficiencies are considered, and thus each hidden layer generates respective outputs that are then input to the next hidden layer. The output layer then generates an output of as an output of an initial ANN network, ultimately corresponding to the ANN 110 upon completion of the training, based on a signal received from final hidden layer. During the training, the parameters (e.g., the connection weights) of the hidden layers of the corresponding interim ANN are repeatedly adjusted or changed based on training input of training data received via the input layer until the output layer outputs a sufficiently accurate value or label that is relatively more easily predictable or useful for the objective predetermined for the ANN network 110. For example, the training could be performed using a gradient based back propagation approach, until the interim ANN network is trained to a predetermined accuracy and/or predetermined inaccuracy, and stored as the ANN network 110. Similarly, during inference (or interpretation) operations according to the trained objective, real world data may be provided to the input layer and the respective hidden layers will each perform respective computational operations, e.g., through respective activation functions of the respective nodes as discussed below, until the output layer generates an output that includes information that can be used to indicate the result of the recognition/liveness or other inference operation for the input image data. Various data structures may be used to store the ANN 110 in the memory of the neural network apparatus. The ANN 110 may also be received from another neural network configured to perform the training and stored in the memory of the neural network apparatus, such as in an alternate example where the neural network does not itself perform the training of the ANN 110. The various data structures may include storing the resulting trained parameters, e.g., trained connection weights and/or kernels, in vector, matrix, volume, or other single or multi-dimensional data structure, such as along with information of the corresponding biases used in, or derived through, the training. The stored parameters of the ANN 110 may further include additional parameters, such as those indicating the number of layers, number of nodes in the respective layers, types of layers, activation functions respectively applied, etc.

In the SNN 120, when a state (for example, a neuron (or node) potential) of a neuron reaches a predetermined threshold, the neuron fires (or spikes) and generates a spike that is transmitted or travels to other neurons (e.g., to neurons of a subsequent layer), and the spike thereby has an influence on states of the other neurons based on a time at which the spike is received. Herein, though the term neuron may be utilized, it is understood that this term may also be synonymous with the term node, and is not intended to be analogous to how a natural biological neuron operates or such natural structures of biological brains. Rather, such neurons are implemented by one or more processors and/or other specialty hardware configured to receive spike(s) or step (or other) function signaling from a previous hardware implemented neuron or as input, e.g., in either analog or such spiked forms, configured to have unique membrane or neuron potential thresholds as discussed herein, and configured to generate and forward activation results in the form of further spike(s), as well as additional signaling in some examples, to a next layer of the SNN 120 or as an output of the SNN. Similar to the use of the term 'neuron', any use of the terms synapses, membrane or neuron potential, are similarly not intended to be analogous to how a natural biological neuron operates or such natural structures of biological brains, as such neuron, synapses, membrane or neuron potential terms are terms of art in unique computer generated neural networks and unique computer implementations of such generated neural networks.

Thus, the SNN 120 is a type of neural network that operates based on an event. In the SNN 120, a low number of operations is used to derive an accurate answer (or result) in comparison to the ANN 110, and a latency until a calculated output is available is reduced. Accordingly, a processing speed and efficiency of the SNN 120 is improved compared to the ANN 110. Also, the SNN 120 processes inputs from event-based sensors, for example, a dynamic vision sensor, and operates based on data. Thus, the SNN 120 may prevent an unnecessary operation from being performed when any input is not received in an "always-on" scenario.

Second parameters 121 of the SNN 120 are thus determined based on the first parameters 111 of the ANN 110 trained with a high performance based on larger-scale datasets for a trained objective. Thus, the SNN 120 of the present disclosure is, in essence, effectively trained based on the larger-scale datasets through the conversion operation of the present disclosure and a recognition accuracy of the SNN 120 is therefore enhanced compared to the typical SNNs, which are considerably difficult to train based on larger-scale datasets, as explained above.

A conversion of the ANN 110 to the SNN 120 is based on matching of an activation of a neuron within the ANN 110 to a firing rate of a corresponding neuron within the SNN 120. The matching of the activation to the firing rate may include, e.g., determining or adjusting the firing rate based on the activation.

A conversion of an activation of the ANN 110 to the activation of the SNN 120 is performed based on a rate. The conversion is referred to as a "rate-based conversion." For example, the rate-based conversion is performed by matching an activation of each neuron of the ANN 110 to a firing rate corresponding to a simulation (or implementation) duration of each neuron in the SNN 120 that corresponds to neuron of the ANN 110. In an example, the SNN 120 and the ANN 120 may include substantially the same architecture (e.g., the same amount of nodes and layers) and a neuron in the SNN 120 that correspond to a neuron in the ANN 110 may be, for explanation purposes, located a corresponding position within a corresponding layer as that of its corresponding neuron in the ANN 110. An increase in the firing rate corresponding to the simulation duration may result in an in increase in a number of spikes of the SNN 120 to be generated, which may result in an increase in an accuracy of the rate-based conversion. For example, in a typical SNN, the SNN neurons generate a sequence of discrete spikes, which, when averaged over the simulation duration, approximates the analog activation of the corresponding ANN neuron. This rate-based encoding becomes more accurate as the simulation duration of the SNNs is increased and more spikes are generated. However, because each spike transfers accessed weight information associated with a connection to a subsequent layer, and updates state variables (for example, a neuron potential) of neurons of the subsequent layer, a number of computations performed by the typical SNN increases and a computational cost of the typical SNN may increase in response to an increase in an average firing rate of neurons. In an ANN, neurons are updated all at once using MACs operations, whereas in the typical SNN, activated neurons are repeatedly updated using addition operations. Because an energy cost of such memory transfers exceeds an energy cost of computations, the typical SNN loses a benefit of an SNN in comparison to the ANN in response to an increase in firing rates. That is, while an increase in the firing rate of a typical SNN corresponding to the simulation duration may advantageously result in an increase in an accuracy of the rate-based conversion of an ANN to the SNN, the increase in the firing rate may also detrimentally increase the number of computations performed by the typical SNN.

Rather than the typical rate-based spike sequencing of the typical SNN, in a neural network conversion operation of the present disclosure, an activation of a neuron of an ANN is matched to a reciprocal of information about a timing at which a first spike is to be generated by a neuron of an SNN, thus advantageously reducing the number of computations performed by the SNN. In an example of the neural network conversion operation, each neuron of the SNN generates a maximum of one spike during an inference of one sample. Thus, using the neural network conversion operation, a spatial sparsity of the SNN and a temporal sparsity of the ANN may be combined.

In an example, by implementing the neural network conversion operation of the present disclosure, the implemented SNN may maintain an accuracy loss less than 1% and have an improved performance over the typical ANN by performing 7 to 9 times less operations than that of the typical ANN.

Figure 2:
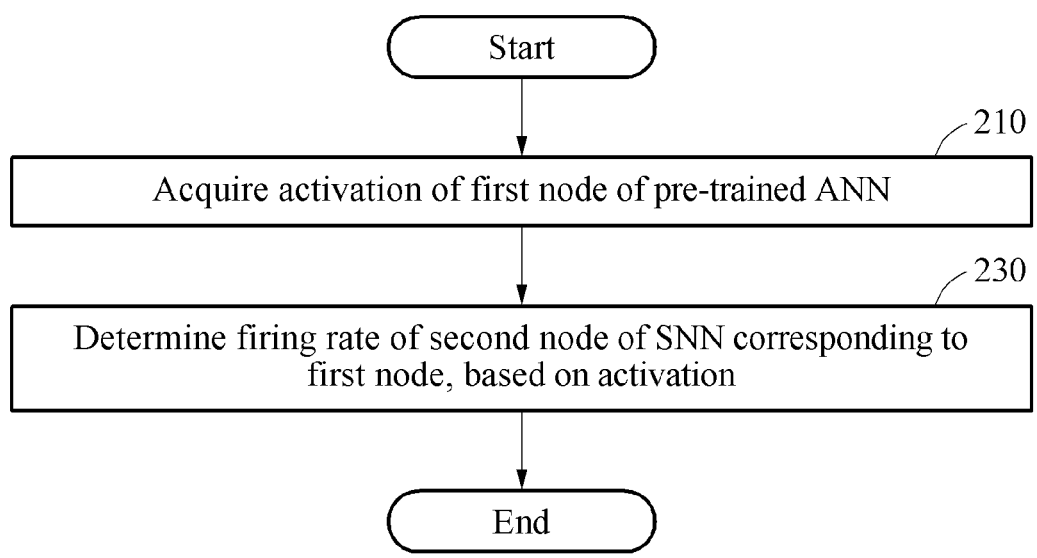
FIG. 2 illustrates an example of a method of converting an ANN to an SNN using a time-to-first-spike (TTFS) scheme.

FIG. 2 illustrates an example of a method of converting an ANN to an SNN using a Time-To-First-Spike (TTFS) scheme.

The TTFS scheme is a scheme of converting an ANN to an SNN by matching an activation of each node included in an ANN to information about a first-spike timing of a respectively corresponding node of an SNN.

Referring to FIG. 2, in operation 210, a conversion apparatus acquires an activation of a first node of a pre-trained ANN.

In operation 230, the conversion apparatus determines a firing rate of a second node of an SNN, corresponding to the first node, based on the acquired activation and first timing information about a timing at which the second node first fires.

The firing rate of the second node may be determined based on Equations 1 through 7 that will be provided below, as non-limiting examples.

A neuron potential of a neuron included in the SNN is defined by Equation 1 as shown below.

$$u_i(t) = \sum_{t_i^{(f)} \in \mathcal{F}_i} \eta_i(t - t_i^{(f)}) + \sum_{j \in \Gamma_i} \sum_{t_j^{(f)} \in \mathcal{F}_j} w_{ij} \epsilon_{ij}(t - t_j^{(f)}) + I_{ext}(t) \quad \text{Equation 1}$$

In Equation 1, $\eta_i$ denotes an action potential (including a possible refractory period), $w_{ij}$ denotes a synaptic weight, a kernel $\epsilon_{ij}$ describes a post-synaptic potential caused by a spike generated by a j-th neuron, and $I_{ext}$ represents a bias. Thus, the synaptic weight may correspond to the synaptic weight corresponding to the activation of the first node of the ANN, for example.

$\mathcal{F}_i = \{t_i^{(f)} | 1 \leq f \leq n\} = \{t | u_i(t) = \theta\}$ denotes a set of output spike timings, and $\Gamma_i$ denotes a set of pre-synaptic neurons.

In an example, only a first spike generated by the second node is used for a determination of the firing rate, and thus, additional spikes may not be used by setting a refractory period to be considerably long. A neuron potential $u_i(t)$ based on a first spike of an i-th neuron may be expressed as shown in Equation 2 below.

$$u_i(t) = \sum_{j \in \Gamma_i} w_{ij} \epsilon_{ij}(t - t_j^{(0)})) + b_i t \quad \text{Equation 2}$$

When a simple piecewise-linear form for $\epsilon_{ij}(t-t_j^{(0)})$ of Equation 2 is selected, $\epsilon_{ij}(t-t_j^{(0)}) = [t-t_j^{(0)}] \mathcal{H}(t-t_j^{(0)})$ is expressed, in which, $\mathcal{H}$ denotes a Heaviside step function.

The Heaviside step function is removed by introducing $\Gamma_i^< = \{j | t_j^{(0)}) < t_i^{(0)})\}$ as a set of "casual neurons" that have spikes arriving at the i-th neuron before an output spike is generated, and as a result, Equation 2 is expressed as shown in Equation 3 below.

$$u_i(t) = \sum_{j \in \Gamma_i^<} w_{ij} [t - t_j^{(0)})] + b_i t \quad \text{Equation 3}$$

In a simulation with a time step dt based on Equation 3, a rate of change in a neuron potential is expressed as shown in Equation 4 below.

$$\frac{u_i(t+dt) - u_i(t)}{dt} = \sum_{j \in \Gamma_i^<} w_{ij} + b_i := \mu_i \quad \text{Equation 4}$$

To determine first timing information $t_i^{(0)}$ about a timing at which the i-th neuron first fires, a neuron potential at $t_i^{(0)}$ is set to a neuron potential threshold $\theta$, which is expressed as $u_i(t_i^{(0)}) = \theta$. Accordingly, for $t_i^{(0)}$, Equation 4 is expressed as shown in Equation 5 below.

$$t_i^{(0)} = \frac{1}{\mu} \left( \theta + \sum_{j \in \Gamma_i^<} w_{ij} t_j^{(0)} \right) \quad \text{Equation 5}$$

Based on Equation 5, the first timing information $t_i^{(0)}$ of the i-th neuron may be determined based on second timing information $t_j^{(0)} (j \in \Gamma_i^<)$ about first-spike timings of the j-th neurons of a previous layer connected to the i-th neuron, a connection weight $w_{ij}$ between the i-th neuron and a j-th neuron of the previous layer, e.g., corresponding to the i-th neuron and j-th neuron of the corresponding layer of the ANN. the neuron potential threshold $\theta$, and an instantaneous rate of change in the neuron potential $\mu$.

In an example, only a first spike generated by a node included in the SNN is used to determine a firing rate of a node of the SNN, as described above, and thus, a firing rate $r_i$ of the i-th neuron may be determined based on Equation 6 shown below.

$$r_i = \frac{1}{t_i^{(0)}} = \frac{\mu}{\theta + \sum_{j \in \Gamma_i^<} w_{ij} t_j^{(0)}} \quad \text{Equation 6}$$

A firing rate $r_i$ of i-th neuron of the SNN thus may thereby match an activation at of a corresponding node of the ANN, i.e., if the ANN were performed, and thus the first timing information $t_i^{(0)}$ may also be inversely proportional to such activation $a_i$ as shown in Equation 7.

$$r_i = \frac{1}{t_i^{(0)}} = a_i \quad \text{Equation 7}$$

$$t_i^{(0)} = \frac{1}{a_i}$$

Thus, based on Equation 7, first timing information $t_i^{(0)}$ of each node included in the SNN is representative of a reciprocal of the activation $a_i$ of a respectively corresponding node in the ANN.

Figure 3:
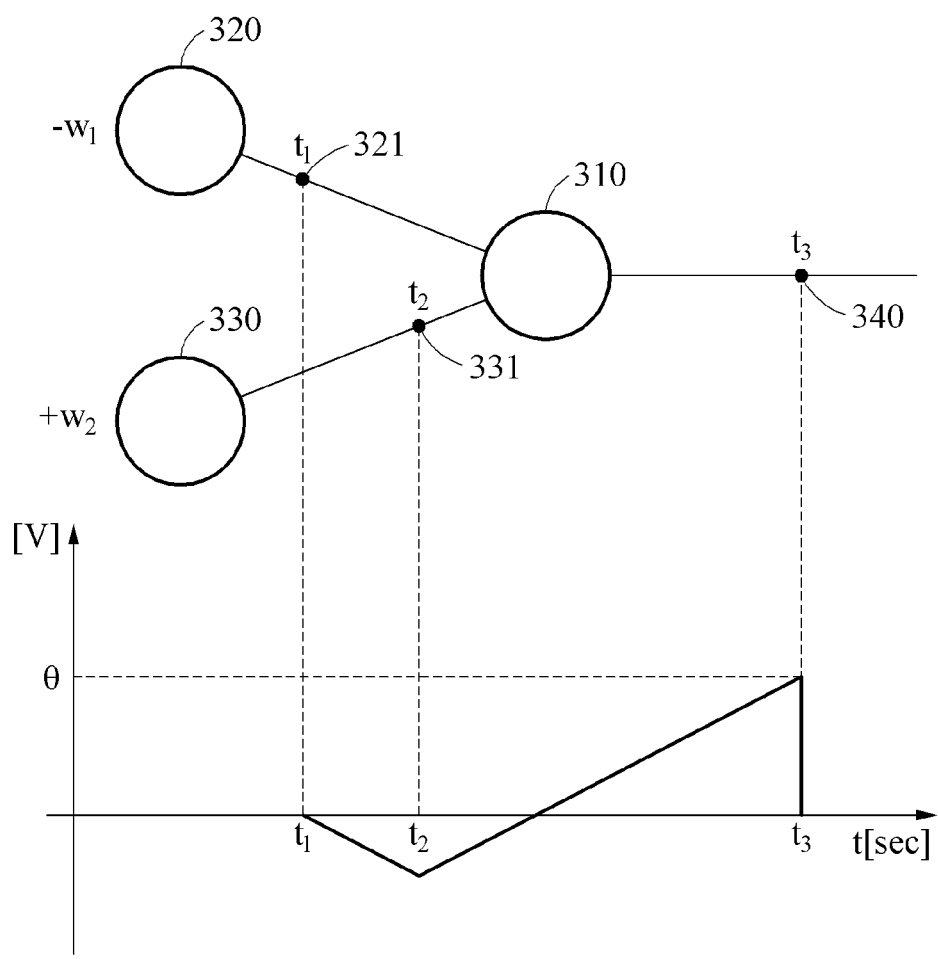
FIG. 3 illustrates an example of a process in which a node of an SNN fires to generate a spike.

FIG. 3 illustrates an example of a process in which a node of an SNN fires to generate a spike.

Referring to FIG. 3, a node 310 of an SNN is connected to nodes 320 and 330 of a previous layer. As shown in a graph of FIG. 3, a node potential of the node 310 (represented on the y-axis of the graph and measured in volts [V]) changes based on a spike of the node 320 generated at a timing $t_1$ 321, and a spike of the node 330 generated at a timing $t_2$ 331. Based on Equation 5 above, the node 310 fires at a timing $t_3$ 340.

Referring to the graph of FIG. 3, based on a connection weight $-w_1$, the node potential of the node 310 decreases after the timing $t_1$ 321 (corresponding to the spike of the node 320) until the timing $t_2$ 331 (corresponding to the spike of the node 330). Based on a connection weight $+w_2$, the node potential of the node 310 increases after the timing $t_2$ 331 (corresponding to the spike of the node 330). At the timing $t_3$ 340, at which the node potential reaches a node potential threshold $\theta$, the node 310 fires to generate a spike, the node potential reduces to zero, and thus a node potential of zero is maintained. Thus, the node 310 generates a maximum of one spike during an inference of one input.

The above-described neural network conversion operation may not fully reflect a portion of an influence of a spike generated by a neuron of a previous layer (e.g., the spike of the node 320 at the timing $t_1$ 321 or the spike of the node 330 at the timing $t_2$ 331) connected to a current neuron (e.g., the node 310) when a firing timing of a portion of neurons in the previous layer is delayed. For example, when a current neuron C is connected to neurons A and B of a previous layer, when connection weights $w_A$ and $w_B$ (of neurons A and B, respectively) are set to "1" and "−2", respectively, and when activations $a_A$ and $a_B$ (of neurons A and B, respectively) are set to "2" and "1", respectively, an influence on the current neuron C may be cancelled in a typical ANN. However, in an SNN generated by above-described neural network conversion operation, the matched current neuron C may receive a spike generated by the matched neuron A twice as rapidly than a received spike generated by the matched neuron B. When the spike of the matched neuron A allows a neuron potential of the current matched neuron C to reach a neuron potential threshold, an influence of the matched neuron B may not be properly and/or effectively taken into consideration in the firing of the current matched neuron C. This may occur due to a long-latency spike caused by a delay in a timing at which a neuron in the SNN fires, such as when the SNN of FIG. 2 fires and/or because the neuron in the SNN may corresponding to a neuron with a low activation in the corresponding ANN. A result of the long-latency spike may be improved through a neural network conversion operation of the present disclosure, examples of which will be further described below with reference to FIGS. 4 and 5.

Figure 4:
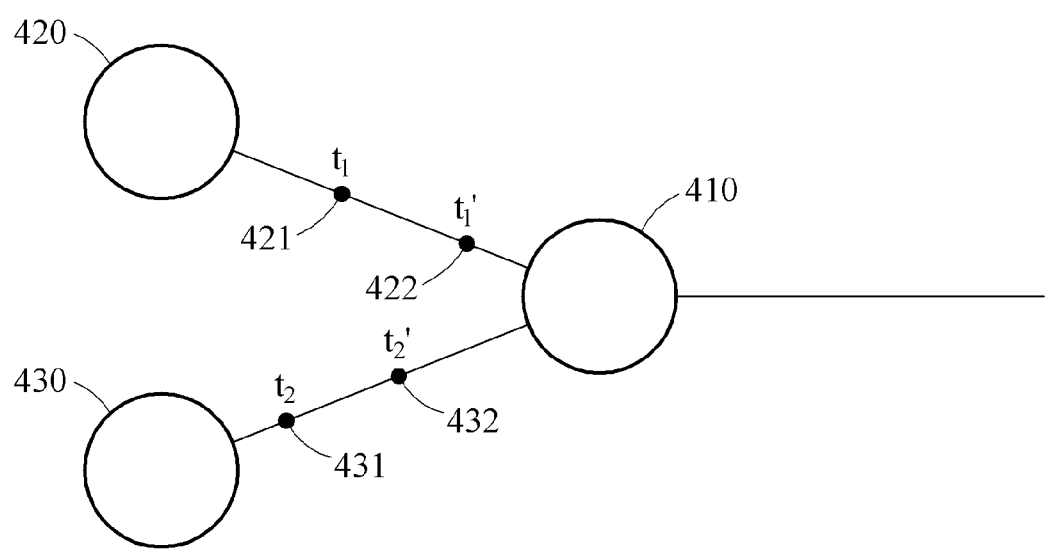
FIG. 4 illustrates an example of adjusting a neuron potential threshold of a node using a TTFS with a dynamic threshold.

FIG. 4 illustrates an example of adjusting a neuron potential threshold of a node using a TTFS with a dynamic threshold that is hereinafter referred to as a "TTFS dyn thresh scheme".

The TTFS dyn thresh scheme is used to adjust a neuron potential threshold, described above with respect to FIG. 2, for firing of a neuron based on a parameter of a node of a previous layer connected to a current node. Thus, based on the adjusted neuron potential threshold, the neural network conversion operation of the present disclosure may thus prevent a spike from being generated before the current node receives all input spikes.

Referring to FIG. 4, nodes 420 and 430 of a previous layer connected to a current node 410 may fire to generate output spikes 422 and 432, respectively, based on the above-described scheme of FIG. 2, for example. Moreover, though, when the nodes 420 and 430 have positive post-synaptic potentials, signals 421 and 431 to provide information about each post-synaptic potentials of nodes 420 and 430 to the current node 410 are generated. For example, the signals 421 and 431 may be in forms of spikes. The signals 421 and 431 respectively imply or indicate to the node 410 that respective output spikes may be generated later in time. For example, when the node 420 has a positive post-synaptic potential, a signal 421 is generated. When a neuron potential reaches the neuron potential threshold, the node 420 outputs the output spike 422.

Thus, in an example, a neuron potential threshold of the current node 410 may be dynamically adjusted. For example, to take into consideration all spikes of the nodes 420 and 430 in a process in which the current node 410 fires, the neuron potential threshold is dynamically adjusted. For example, the neuron potential threshold of the current node 410 is adjusted, based on the signals 421 and 431, to be proportional to an amount of spikes that have not yet arrived among spikes of the nodes 420 and 430 connected to the current node 410 (e.g., the spikes 422 and 432). For example, in the example of FIGS. 2 and 3, the node 310 may expect only one spike, while the node 410 may expect two spikes, as non-limiting examples. When the current node 410 receives an output spike, the neuron potential threshold is reduced by the connection weight corresponding to each output spike. A percentage (that is, a percentage of an output spike being generated) that the current node 410 fires is inversely proportional to an amount (for example, a number of spikes) of information that is not received yet.

Based on the foregoing the neuron potential threshold of the current node 410 is adjusted based on potential information (for example, post-synaptic potentials) of the nodes 420 and 430. This is based on the fact that nodes 420 and 430 provide signals 421 and 431 based on post-synaptic potentials of nodes 420 and 430.

A dynamically determined neuron potential threshold for node 410 may be expressed as shown in Equation 8.

$$\theta_i(t) = \theta_i(\infty) + \Sigma_{j \in \Gamma_i} |w_{ij}| \mathcal{H}(x_j(t)) \qquad \text{Equation 8}$$

In Equation 8, $\theta_i(\infty)$ denotes a neuron potential threshold at infinite time, $w_{ij}$ denotes the corresponding connection weight, $x_j(t)$ denotes a post-synaptic potential of a neuron of a previous layer connected to a current neuron, and $\mathcal{H}$ denotes a Heaviside step function.

In an example based on the above description, in this TTFS dyn thresh scheme, each node of the SNN may fire a maximum of two spikes in a single inference process. A first generated spike (e.g., the signal 421 and/or the signal 431) is a spike that provides information indicating that another spike (e.g., the spike 422 and/or the spike 432, respectively) is to be output at a later time, and the other spike is the output spike corresponding to the activation. The signal 421 and/or the signal 431 may be referred to as an indicator spike. Accordingly, by detecting and using the signal 421 and/or the signal 431, an example method of the present application may accurately predict that the spike 422 and/or the spike 432, respectively, will occur and may therefore effectively dynamically adjust the neuron potential threshold to account for the spike 422 and/or the spike 432 that will occur in combination with receipt of signals 421 and 431.

Figure 5:
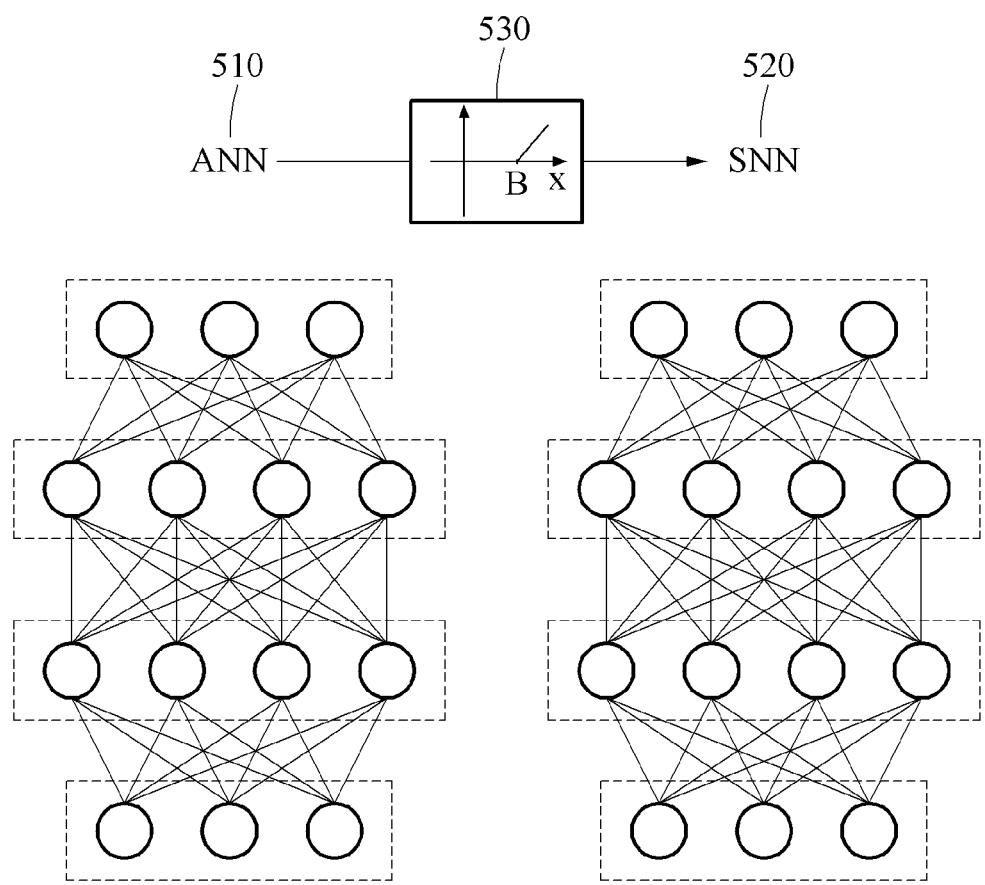
FIG. 5 illustrates an example of converting an ANN to an SNN using a TTFS with clamped rectified linear unit (ReLU).

FIG. 5 illustrates an example method of the present disclosure of converting an ANN to an SNN using a TTFS with clamped rectified linear unit (ReLU) that is hereinafter referred to as a "TTFS clamped scheme."

The TTFS clamped scheme may be used to filter an activation of each neuron of an ANN through a modified ReLU activation function to configured the resultant trained parameter in a form to reduce minimum activations and thereby improve accuracy of the SNN according to FIGS. 2-4. Through the filtering, neurons with relatively low activations are filtered as inactive neurons, and neurons with activations greater than or equal to a predetermined threshold are taken into consideration. Accordingly, by filtering out neurons with relatively low activations, the TTFS scheme of the present disclosure may effectively avoid performing less beneficial processes that otherwise would be performed based on the low activations, thereby reducing the total number of processes performed and thereby improving a processing speed of the TTFS and, e.g., a processing speed of one or more processors on which the TTFS scheme may be implemented. With the TTFS clamped scheme, the conventional SNN employs the neurons with the activations greater than or equal to the threshold, and thus a current neuron does not need to wait for a long-latency spike.

Referring to FIG. 5, an activation of each neuron of an ANN 510 is filtered using a filter 530, and the ANN 510 is converted to an SNN 520 based on a filtering result.

For example, the filter 530 filters an activation of a neuron based on a modified ReLU activation function. The filter 530 is implemented based on Equation 9 shown below.

$$relu_{clamp}(x) = \begin{cases} 0 & \text{if } x \le B \\ x & \text{else} \end{cases} \qquad \text{Equation 9}$$

The filter 530 filters an activation less than or equal to a threshold B to zero.

The TTFS clamped scheme may implement a process of retraining the ANN 510 using the filter 530, and such remaining training as discussed above, and the retrained ANN may be converted to the SNN 520. Alternatively, the training of the ANN may include such final training operation to generate the retrained ANN.

Another example of a neural network conversion operation of the present disclosure may be determined based on a pattern of received spikes. A conversion scheme called a "Temporal Pattern Coding (TPC) scheme" may be used to match an activation of a node of a pre-trained ANN to a pattern of "N" spikes. For example, an N-bit word represented by binary numbers may be matched to a sequence of "N" spikes. A spiking timing of a pre-synaptic neuron may be used to determine an amount of charges to be accumulated as a neuron potential of a post-synaptic neuron. The post-synaptic neuron infers an amount of charges that need to be added to a neuron potential based on information about a timing at which an input spike arrives. The TPC scheme may be used to log-compress activation values through "N" number of times of spiking. For example, a spike representing an activation expressed by a factor of $2^N$ in the TPC scheme may be delayed by "N" time steps. The TPC scheme may provide a more compact scheme with respect to a time. Also, the TPC scheme may provide an accuracy similar to that of an ANN through fewer operations.

Figure 6:
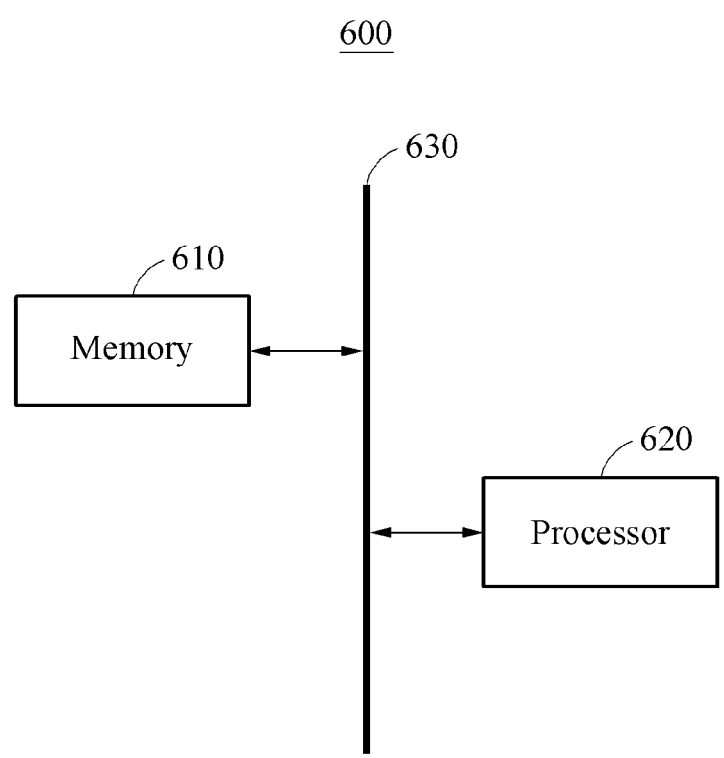
FIG. 6 illustrates an example of a neural network apparatus.

FIG. 6 illustrates an example of a neural network apparatus 600.

Referring to FIG. 6, the neural network apparatus 600 includes a memory 610 and a processor 620. The memory 610 and the processor 620 exchange data with each other via a bus 630.

The memory 610 includes, for example, a volatile memory, or a nonvolatile memory. The memory 610 stores information received via the bus 630. The memory 610 includes one or more instructions executable by the processor 620 to implement any, any combination, or all operations described herein. Also, the memory 610 stores data about a pre-trained ANN and/or a resultant trained ANN by the processor 630. For example, the memory 610 may also store data about connection weights and activations of each neuron in the pre-trained ANN.

The processor 620 is configured to determine a firing rate of each node of an SNN based on the data about the pre-trained ANN stored in the memory 610, and to convert the pre-trained ANN to the SNN.

The processor 620 determines, based on an activation of a first node of the pre-trained ANN, a firing rate of a second node of the SNN corresponding to the first node. The processor 620 determines the firing rate based on first timing information about a timing at which the second node first fires. For example, the firing rate may be determined based on Equations 6 and 7.

To mitigate a problem caused by the above-described long-latency spike, the processor 620 may also dynamically adjust a neuron potential threshold of the SNN based on Equation 8. Also, the processor 620 may perform the training of the ANN, or retraining of the ANN as discussed above to filter an activation of each neuron of the ANN using a filter based on Equation 9 and accordingly a problem made by the long-latency spike does not need to be taken into consideration.

Further, the processor 620 is configured to implement either one or both the pre-trained ANN and any one of the SNNs described herein. In an example, the processor 620 may be a specialized computer, or may be representative of one or more processors to control a specialized SNN processor according to the conversion of the ANN. In an example, the specialized processor may be a neuromorphic chip or processor.

The above descriptions of FIGS. 1 through 5 are equally applicable to the neural network conversion apparatus 600 of FIG. 6, and accordingly is not repeated here.

The ANN 110, the SNN 120, the node 310, the node 320, the node 330, the node 410, the node 420, the node 430, the ANN 510, the SNN 520, the filter 530, the neural network conversion apparatus 600, the memory 610, the processor 620, and other apparatuses, units, modules, devices, and other components described herein with respect to FIGS. 1 through 6 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network method, the method comprising:
   acquiring connection weight of an analog neural network (ANN) node of a pre-trained ANN;
   generating a spiking neural network (SNN) by determining a firing rate of an SNN node of the SNN, corresponding to the ANN node, based on the connection weight and information indicating a timing at which a first SNN node initially fires to generate a first spike such that other spikes subsequent to the first spike are unused in determining the firing rate of the SNN node; and
   performing an inference operation including recognition, liveness, and/or classification associated with input data, based on an output from the SNN being generated,
   wherein the determining of the firing rate comprises:
   determining first timing information based on previous timing information indicating a timing at which a second SNN node of a previous layer connected to the first SNN node fires, a connection weight between the first SNN node and the second SNN node, a neuron potential based on the first spike of the first SNN node and an instantaneous rate of change in the neuron potential, and
   wherein the first timing information of each node included in the SNN is determined based on a reciprocal of an activation of a respectively corresponding node in the ANN.

2. The method of claim 1, wherein the information indicating the timing at which the SNN node fires is determined based on the first timing information about the timing at which the SNN node initially fires.

3. The method of claim 2 wherein the determining of the firing rate comprises:
   determining the firing rate based on the determined first timing information.

4. The method of claim 2, wherein the determined firing rate is inversely proportional to the timing at which the first SNN node first fires.

5. The method of claim 1, wherein a node potential threshold for firing of the SNN node is determined based on potential information of other SNN nodes of a previous layer connected to the SNN node.

6. The method of claim 5, wherein the node potential threshold is determined based on node potential information of SNN nodes that correspond to a positive post-synaptic potential among the other SNN nodes.

7. The method of claim 5, wherein nodes including a positive post-synaptic potential among the other SNN nodes provide signals corresponding to the potential information to the SNN node.

8. The method of claim 1, further comprising:
   retraining the ANN to filter activations of the ANN based on a predetermined minimum threshold, wherein the weight is acquired based on a result of the retraining.

9. The method of claim 8, wherein the filtering of the activation comprises filtering out an activation of the activations that is less than or equal to the threshold.

10. A non-transitory computer-readable storage medium storing instructions that, when executed by one or more processors, cause the one or more processors to perform the method of claim 1.

11. A neural network apparatus comprising:
one or more processors configured to:
generate a spiking neural network (SNN) by determining a firing rate of an SNN node of the SNN, corresponding to an analog neural network (ANN) node of an ANN, based on respective weights of the ANN node and firing timing information at which a first SNN node initially fires to generate a first spike such that other spikes subsequent to the first spike are unused in determining the firing rate of the SNN node; and
performing an inference operation including recognition, liveness, and/or classification associated with input data, based on an output from the SNN being generated,
wherein the determining of the firing rate comprises:
determining first timing information based on previous timing information indicating a timing at which a second SNN node of a previous layer connected to the first SNN node fires, a connection weight between the first SNN node and the second SNN node, a neuron potential based on the first spike of the first SNN node and an instantaneous rate of change in the neuron potential, and
wherein the first timing information of each node included in the SNN is determined based on a reciprocal of an activation of a respectively corresponding node in the ANN.

12. The neural network apparatus of claim 11, wherein the firing time information comprises first timing information about a timing at which the first SNN node first fires.

13. The neural network apparatus of claim 12, wherein the one or more processors are configured to determine a node potential threshold for firing of the SNN node, based on post-synaptic potential information of the second SNN node.

14. The neural network apparatus of claim 11, wherein the one or more processors are configured to:
retrain activations of the ANN based on a predetermined threshold wherein the activation is acquired based on a result of the filtering.

15. The apparatus of claim 10, wherein the one or more processors are one or more neuromorphic processors.

16. The apparatus of claim 10, further comprising memory storing instructions that, when executed by the one or more processors, configure the one or more processors to perform the determination.

17. A processor-implemented neural network method, the method comprising:
acquiring a weight of an analog neural network (ANN) node of a pre-trained ANN;
determining, based on the weight, an initial firing timing of a first spiking neural network (SNN) node corresponding to the ANN node, the initial firing timing corresponding to a timing at which the first SNN node initially fires to generate a first spike;
generating the SNN based on a result of determining a firing rate of the first SNN node such that other spikes subsequent to the first spike are unused in determining the firing rate of the first SNN node; and
performing an inference operation including recognition, liveness, and/or classification associated with input data, based on an output from the SNN being generated,
wherein the determining of the firing rate comprises:
determining first timing information based on previous timing information indicating a timing at which a second SNN node of a previous layer connected to the first SNN node fires a connection weight between the first SNN node and the second SNN node, a neuron potential based on a first spike of the SNN node and instantaneous rate of change in the neuron potential, and
wherein the first timing information of each node included in the SNN is determined based on a reciprocal of an activation of a respectively corresponding node in the ANN.

18. The method of claim 17, wherein the determining of the initial firing time of the first SNN node comprises:
receiving a signal from the second SNN node of the previous layer indicating a spike of the second SNN node to be subsequently generated;
adjusting, based on the received signal, a node potential threshold of the first SNN node; and
determining, based on a result of the adjusting, the initial firing time of the first SNN node.

19. The method of claim 17, wherein:
the generating of the SNN comprises setting a node potential threshold of the first SNN node based on receipt of an indicator spike from the second SNN node of the previous layer, and
a firing timing of the first SNN node is based on the weight of the ANN node.

20. The method of claim 1, wherein the first SNN node generates a maximum of one spike during an inference of one input from the input data.

* * * * *